Jan. 23, 1951        C. C. GROVE        2,539,074
ELECTRICAL PROCESS FOR DEHYDRATING OIL
Filed May 5, 1944
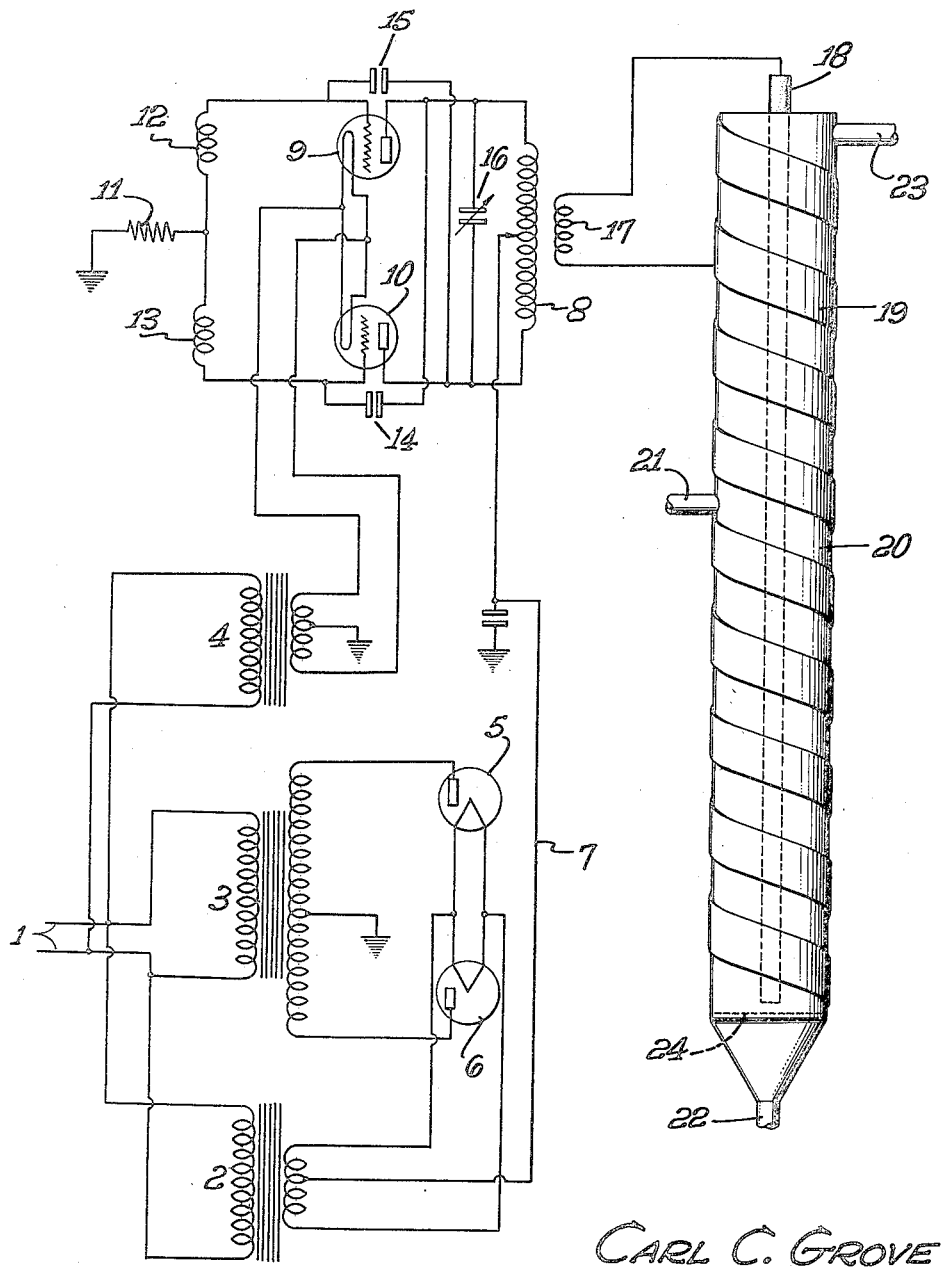
CARL C. GROVE
INVENTOR.
BY Ross J. Garofalo
ATTORNEY.

Patented Jan. 23, 1951

2,539,074

UNITED STATES PATENT OFFICE 2,539,074

ELECTRICAL PROCESS FOR DEHYDRATING OIL

Carl C. Grove, Gardena, Calif., assignor to Union Oil Company of California, Los Angeles, Calif., a corporation of California Application May 5, 1944, Serial No. 534,376

4 Claims. (Cl. 204—191)

This invention relates to the separation of fluid mixtures by electrical means, and relates particularly to the dehydration of crude oil by subjecting it to electrical oscillations of extremely high frequencies.

Crude petroleum as produced generally contains water, a small amount of it being actually dissolved in the oil, but the bulk of it being merely mixed with the oil in the form of tiny droplets surrounded by oil. This water is a great nuisance in the subsequent refining of the oil, since it may cause serious corrosion of distillation equipment. The corrosion is aggravated by the fact that the water generally contains inorganic salts, which may decompose on distillation to form extremely corrosive products. As a consequence, it has been found desirable to dehydrate the oil prior to refining, by agglomerating the water droplets to form a layer of water relatively free from oil and a layer of oil relatively free from water, and separating these layers. Two general methods of carrying out this dehydration are in common use. One of these is termed chemical dehydration, which involves the addition to the crude oil of a chemical which will accelerate the agglomeration of the water droplets and the settling out of the water layer; and the other method is termed electrical dehydration, and involves subjecting the wet crude oil to the action of an alternating electric current to accelerate the agglomeration and settling.

In electrical dehydration as presently carried out, it is customary to employ the 50 or 60 cycle alternating current usually available, and to step up the voltage by means of conventional transformers, to a value of about 5,000 to 33,000 volts, without changing the frequency. This high voltage is then applied to two electrodes spaced about 3 or 4 inches apart, between which the wet oil is passed. The water droplets thereby apparently become electrically charged, and the increased potential difference between opposite charges on adjacent droplets tends to disrupt the oil film between the droplets, and cause them to coalesce. As this process continues, the enlarged drops of water settle to the bottom of the container and form a distinct water layer which may be drawn off as formed, the dehydrated oil being withdrawn from the top of the container.

The above dehydration process is very successful and is quite economical for most crude oils of moderate water content in which the water is not too tightly emulsified. When the crude is excessively wet, however, or operating conditions are not exactly right, there is a good deal of short-circuiting of the electrodes due to momentary existence of a continuous path of water between them. The water being a reasonably good conductor, this results in excessive consumption of electrical power. Furthermore, when very tight emulsions are encountered, extremely high voltage gradients must be employed, i. e. where normally a voltage of 33,000 volts across a 3-inch gap, resulting in a voltage gradient of 11,000 volts per inch, is satisfactory for most crude oils, gradients as high as 100,000 volts per inch may be required for such oils.

It is also true that the agglomerating action is much more marked at or near the surface of the electrodes than it is within the body of the oil, i. e. that the effective "penetration" of the usual low-frequency voltage is limited; and this is another reason why the gaps between the electrodes are generally less than about 4 inches, and frequently less than 1 inch. This aggravates short-circuiting difficulties.

It has now been discovered that the above difficulties may be eliminated by employing an oscillating electric current of extremely high frequency, i. e. of frequency greater than about a million cycles, and preferably between about 10 million and about 30 million cycles. These frequencies are above the usual commercial radio broadcast frequencies, and are in the extreme short wave region. Even frequencies of about 100 million cycles may be employed to advantage. These high frequencies permit much greater depth of effective penetration of the oil, so that the electrodes may be spaced farther apart, thus increasing the capacity of the dehydrator unit without decreasing the effectiveness. This also reduces the loss of effective power through short-circuiting. Furthermore, these frequencies penetrate ordinary dielectrics or insulators, making it possible to interpose a dielectric container between the electrodes and thus entirely eliminating short circuiting. For example, equipment such as that shown in the drawing may be employed, wherein continuous alternating current waves of approximately sine wave form and having the desired frequency are generated and the oil to be dehydrated passes through a glass tube having a central electrode in direct contact with the oil, and having the other electrode wrapped around the outside of the tube, out of all contact with the oil. Electric currents having frequencies lower than about one million cycles, such as about 500,000 or lower, do not exhibit this marked penetration effect. Frequencies greater than about ten million cycles are preferred, therefore, since this penetration effect increases very rapidly with increased frequency.

The drawing is a diagrammatic illustration of one form of equipment which may be employed in carrying out the process of this invention.

Referring to the drawing, lines 1, carrying a conventional alternating electric current such as 110 volt, 60 cycle alternating current, lead to the primary coils of transformers 2, 3 and 4. The secondary coil of transformer 2 supplies the filament current for rectifier tubes 5 and 6 which may be of the 866 mercury vapor rectifier type. The plate voltage for these tubes is supplied from the secondary coil of transformer 3 which is a high voltage step-up transformer, in this case impressing a potential of about 1500 volts on the plates of tubes 5 and 6. Tubes 5 and 6 are connected as shown to provide full-wave rectification and produce approximately 1500 volt direct current potential which is carried through line 7 and inductance 8 to plates of tubes 9 and 10. In this example, tubes 9 and 10 are 100 watt dissipation transmitting tubes such as the 100 TL diathermy tubes and are connected in push-pull in a high frequency oscillating circuit as shown. The filament current for these tubes is supplied by the secondary coil of transformer 4. Resistor 11 has a resistance of 3500 ohms, coils 12 and 13 have inductances of about 1 millihenry each, condensers 14 and 15 have capacities of 0.005 mfd., variable condenser 16 has a maximum capacity of 0.0001 mfd., and coil 8 has an inductance of about 1 microhenry. Loop 17 is coupled to coil 8 so as to provide maximum power for the dehydrator unit.

In one operation of the above unit, condenser 16 was adjusted to provide a frequency of the output current from coil 17 of about 15 million cycles. This current was coupled to the two electrodes 18 and 19 of the dehydrator unit, which consisted of a Pyrex glass container 20 of about 3 inch inside diameter, about 2 feet long, with a side tube 21 attached at about the middle, and tubes 22 and 23 respectively at the bottom and top of the container. Tube 21 was used for introduction of wet oil to the unit, and tubes 22 and 23 were employed for withdrawal of the separated water and the dehydrated oil, respectively. The oil-water interface 24 was kept below the bottom of the central electrode 18, which was a rod of carbon having a diameter of about ⅓ inch. The outer electrode 19 consisted of a coil of flat aluminum strip wound in spiral form around the Pyrex container.

In the present example of a dehydration operation employing the above unit, a wet crude oil from the Dominguez, California field was continuously introduced into tube 21 at a rate of about 4 gallons per hour. Water settled out and was withdrawn continuously from line 22 at a rate of about 1 gallon per hour. Dehydrated oil was recovered by continuous withdrawal from line 23 at a rate of about 3 gallons per hour. The temperature of the entering oil and the withdrawn oil were about 80° F. and 90° F., respectively. The characteristics of the wet oil and dehydrated oil follow:

|  | Wet | Dehydrated |
|---|---|---|
| Water content, per cent by weight | 25 | 0.1 |
| Gravity, °API at 60° F | 28.0 | 34.0 |

It is obvious that the invention is not to be limited to the particular equipment shown. Any means for obtaining a current of the extremely high frequencies specified may be employed. The voltage need not be high, even about 100 volts or less being sufficient in many instances. The power supply may be a transformer-rectifier set as shown, or an alternating current generator plus a rectifier, or simply a direct-current generator. The high-frequency generator may be a Hartley type oscillator as shown, or any other suitable oscillator such as the Colpitts, or tuned-plate tuned-grid type, or may be a combination of a fixed frequency crystal oscillator of low power followed by a power amplifier of conventional push-pull or other design. Such oscillator and amplifier circuits are described in many radio handbooks, such as The Radio Handbook published by Radio, Ltd. of New York city. More powerful tubes and auxiliary equipment than those shown may be employed to obtain flow rates equalling or exceeding those of present commercial installations.

The dehydrator unit need not be of the size and design shown. Longer or shorter distances between electrodes may be employed, up to distances of 10 feet or more. the two electrodes being preferably equi-distant throughout. It is preferable to interpose a dielectric container between the electrodes, such as a glass tube as shown, or a clay, quartz, plastic or other dielectric container; but the electrodes may also be both in direct contact with the mixture to be separated, or both may be shielded by dielectrics, if desired. The electrodes may be made of any suitable conductor, and their forms may be different from that shown.

In another modification of the process, the oil to be dehydrated is passed through the dehydration zone where it is subjected to the high frequency oscillations as described above, and then it is passed into a settling zone wherein the oil and water phases are allowed to stratify and are separated. This may be done in the process illustrated in the drawing for example, by passing the wet oil into tube 20 through line 23 and withdrawing it from line 22, or passing it in through line 22 and withdrawing it from line 23; and passing the withdrawn oil to a settling zone, not shown, wherein the oil and the water are separated.

Although the above description of the invention has been limited to its application to dehydration of crude oils, which is a preferred application, the invention is applicable to the breaking of any emulsion of an aqueous phase in an oily phase, or even to the breaking of oil-in-water emulsions, or to the precipitation of finely divided solids from fluids, as in the collection of dusts from the air or flue gases, etc. In general, the process may be used for separating any heterogeneous mixture comprising one material dispersed in the form of finely divided particles in another material, the second material being a fluid (liquid or gas), by agglomerating the dispersed particles.

Other modifications of the invention which would occur to one skilled in the art are to be included in the scope of the invention as defined by the following claims.

I claim:

1. A process for agglomerating particles of an aqueous phase which are dispersed in a petroleum oil phase as an emulsion, which comprises passing said emulsion between two electrodes charged with an alternating electric current having a continuous sine wave form and a frequency between about 1 million and about 100 million cycles per second, thereby agglomerating said particles of the aqueous phase, and separately withdrawing the agglomerated aqueous phase and the oil phase.

2. A process for agglomerating particles of an aqueous phase which are dispersed in a petroleum oil phase, which comprises passing a mixture of the two phases between two electrodes charged with an alternating electric current having a continuous sine wave form and a frequency between about 10 million and about 30 million cycles per second, thereby agglomerating said particles of the aqueous phase, and separately withdrawing the agglomerated aqueous phase and the oil phase.

3. A process for dehydrating wet crude oil which comprises passing said crude oil between two electrodes charged with an alternating electric current having a continuous sine wave form and a frequency greater than about one million cycles per second but not substantially greater than 100 million cycles per second so as to agglomerate the water droplets suspended in said oil without substantial vaporization thereof.

4. A process according to claim 3 in which one of the electrodes is in direct contact with the oil and the other is shielded from direct contact with the oil by means of an interposed dielectric.

CARL C. GROVE.

REFERENCES CITED

The following references are of record in the file of this patent:

UNITED STATES PATENTS

| Number | Name | Date |
|---|---|---|
| 1,170,184 | Peek | Feb. 1, 1916 |
| 1,533,711 | Stevens | Apr. 14, 1925 |
| 1,539,647 | Chase | May 25, 1925 |
| 1,873,857 | Worthington et al. | Aug. 23, 1932 |
| 1,959,385 | Roberts | May 22, 1934 |
| 1,978,426 | Hahn | Oct. 30, 1934 |

FOREIGN PATENTS

| Number | Country | Date |
|---|---|---|
| 301,930 | Great Britain | Nov. 28, 1929 |
| 500,545 | Great Britain | Feb. 8, 1939 |
| 286,644 | Italy | June 17, 1931 |

OTHER REFERENCES

"Hackh's Chemical Dictionary," second edition (1937), pages 786, 787.